United States Patent [19]

Kamp et al.

[11] Patent Number: 5,261,810
[45] Date of Patent: Nov. 16, 1993

[54] CLOSING AND CLAMPING SYSTEM

[75] Inventors: Wim Kamp, Scotch Plains; Leonard Buys, East Brunswick, both of N.J.

[73] Assignee: Captive Plastics, Inc., Piscataway, N.J.

[21] Appl. No.: 945,773

[22] Filed: Sep. 16, 1992

[51] Int. Cl.⁵ .......................................... B29C 33/24
[52] U.S. Cl. ..................... 425/451.9; 74/89.15; 164/339; 425/541; 425/590; 425/451.2
[58] Field of Search .................. 425/541, 451.9, 451.2, 425/589, 590; 164/339, 343; 74/89.15, 661

[56] References Cited

U.S. PATENT DOCUMENTS

| | | | |
|---|---|---|---|
| 3,104,433 | 9/1963 | Hoern | 164/312 |
| 3,184,810 | 5/1965 | Hoern | 74/661 X |
| 3,357,045 | 12/1967 | Ninneman | 425/541 X |
| 3,497,919 | 3/1970 | Brochetti | 164/343 X |
| 3,704,973 | 12/1972 | Renfrew et al. | 425/150 |
| 3,712,774 | 1/1973 | Parker | 425/451.2 X |
| 4,106,885 | 8/1978 | Poncet | 425/451.9 X |
| 4,592,714 | 6/1986 | Gutjahr | 425/590 X |
| 4,696,632 | 9/1987 | Inaba | 425/150 |
| 4,710,119 | 12/1987 | Otake | 425/136 |
| 4,747,982 | 5/1988 | Nakatsukasa et al. | 425/451.9 X |
| 4,929,165 | 5/1990 | Inaba et al. | 425/150 |
| 4,966,738 | 10/1990 | Inaba et al. | 425/150 |
| 4,968,239 | 11/1990 | Inaba et al. | 425/150 |
| 4,984,980 | 1/1991 | Ueno | 425/595 |

Primary Examiner—Richard L. Chiesa
Attorney, Agent, or Firm—Caesar, Rivise, Bernstein, Cohen & Pokotilow, Ltd.

[57] ABSTRACT

A machine including a system for moving one member into engagement with another and to apply a high clamping force thereto. The system includes an electrically operated pump and an associated cylinder assembly. The cylinder assembly includes a housing having first and second chambers, each having actuating fluid therein. A piston is located within the housing and is coupled to one member. A ballscrew and associated nut are located within the housing coupled to the piston and arranged to move the piston in either of two opposite directions under power from an externally located electrical servomotor. When the piston is moved in one direction it carries the associated member into engagement with the other member and also causes actuating fluid to flow from the second chamber into the first chamber. The pump is arranged to provide additional actuating fluid to the first chamber for applying a clamping force directly to the piston, and not to the ball screw and nut. Controllable valves are provided to ensure proper operation of the system.

23 Claims, 3 Drawing Sheets

CLOSING AND CLAMPING SYSTEM

FIELD OF THE INVENTION

This invention relates generally to a system for moving a pair of members (e.g., mold sections) into engagement with each other and for applying high clamping pressure thereon, and more particularly to the use of such a system in an apparatus for molding plastic parts (e.g., injection blow molding plastic bottles and other containers).

BACKGROUND ART

Various systems for applying clamping pressure to a pair of mold sections of a molding machine have been disclosed in the patent literature. See for example, United States Letters Patent Nos. 3,104,433 (Hoern), 3,704,973 (Renfrew et al), 4,696,632 (Inaba), 4,710,119 (Otake), 4,929,165 (Inaba et al), 4,968,239 (Inaba et al), 4,966,738 (Inaba et al), and 4,984,980 (Ueno).

Renfrew et al '973 patent discloses the use of an

The electrical induction motor having a shaft to which a nut is secured. The nut meshes with threads of a lead screw so that when the motor is operated, i.e., rotated, the lead screw moves in a first direction to carry one mold section toward the other section to close the sections. An annular cylinder having a hydraulically operated annular piston therein is mounted to the motor with the lead screw extending through the center of the cylinder and with the piston secured to the nut on the lead screw. A pair of annular spaces are provided in the cylinder on either side of the piston. Oil from a high pressure pump or pressure accumulator is injected into one annular space to apply a high clamping force directly on the nut threadedly mounted on the lead screw and carrying the piston, to thereby establish the final closing pressure on the mold sections. Thus, the high clamping force is imposed directly on the nut and lead screw; thereby requiring that they be of a sufficiently large size and of a sufficiently rigid construction to repeatedly withstand the high clamping forces imposed upon them during the mold closing and clamping operations. The introduction of oil into the other annular space effects the initial retraction of the piston and hence the lead screw with it. Thereafter the motor is operated to rotate in the opposite direction to carry the lead screw with it so that the mold sections are separated.

The Ueno '980 patent and the Hoern '433 patent also disclose the use of electric motors to advance mold sections into a substantially closed condition, and thereafter use separate hydraulic cylinders to maintain a clamping pressure of the closed mold sections.

While those patents may be generally suitable for their intended purposes they never the less leave something to be desired from one or more of the following standpoints, simplicity of construction, cost, efficiency and reliability of operation, power consumption.

OBJECTS OF THE INVENTION

Accordingly, it is a general object of this invention to provide a system which overcomes the disadvantages of the prior art.

It is a further object of this invention to provide an efficient system for closing and applying clamping pressure to opposed members.

It is a further object of this invention to provide an efficient system for closing and applying clamping pressure to mold sections of a molding machine.

It is still a further object of this invention to provide a system for use in a molding machine which effects the closure and application of high clamping pressure to mold sections utilizing relatively low power motors.

It is yet a further object of this invention to provide a system for use in a molding machine which effects the closure of the machine's mold sections using an electrical servomotor, and which applies high clamping pressure to such mold sections utilizing a relatively low power, electrically operated hydraulic pump.

SUMMARY OF THE INVENTION

These and other objects of this invention are achieved by providing a system for use in a machine having a pair of members to be closed and clamped. The preferred system is arranged to move one of the members into engagement with the other, and thereafter to apply a high clamping force to the engaging members.

The system comprises pump means and housing means. The housing means comprises first and second chambers having actuating fluid therein, piston means located within the housing means and coupled to the one member, and electrically driven means located within the housing means and coupled to the piston means. The electrically driven means is arranged to move the piston means in a first direction to carry the one member into engagement with the other, under relatively low torque conditions. The movement of the piston means in the first direction also causes actuating fluid from the second chamber to flow into the first chamber. The pump means is arranged to provide a small additional volume of actuating fluid to the first chamber, after the pair of members have been closed, to thereby apply a high clamping force directly to said piston means (i.e., not through the electrically driven means) to maintain the members in a closed condition.

In a preferred embodiment of this invention the pair of members to be closed and clamped are mold sections of a molding machine, and the actuating fluid which is employed is a hydraulic fluid.

In accordance with a preferred embodiment of this invention the electrically driven means comprises a ball screw and associated ball nut which are coupled to the piston means and which are driven by an externally located electrical servomotor. The ball screw preferably is spring mounted for slight axial movement, preferably through the spring mounting of a thrust bearing assembly of the ball screw, through bellville washers, to thereby permit the ball screw to move axially with the piston means in the event that the piston means does move slightly in an axial direction when the pump means is operated to provide the additional hydraulic fluid to the first chamber to cause the piston means to apply the high clamping force to the engaging members (e.g., mold sections). In this manner the high clamping force is not required to be supported by the ball screw.

In accordance with the most preferred embodiment of this invention the pump means comprises a low power, motor driven hydraulic pump, since it only needs to move small volumes of hydraulic oil to establish the required high clamping force on the closed members.

BRIEF DESCRIPTION OF THE DRAWINGS

Other objects and many of the attendant advantages of this invention will readily be appreciated as the same becomes better understood by reference to the following detailed description of the preferred embodiment of the invention when considered in connection with the accompanying drawings wherein.

DETAILED DESCRIPTION OF THE PREFERRED EMBODIMENT

Figure 1:
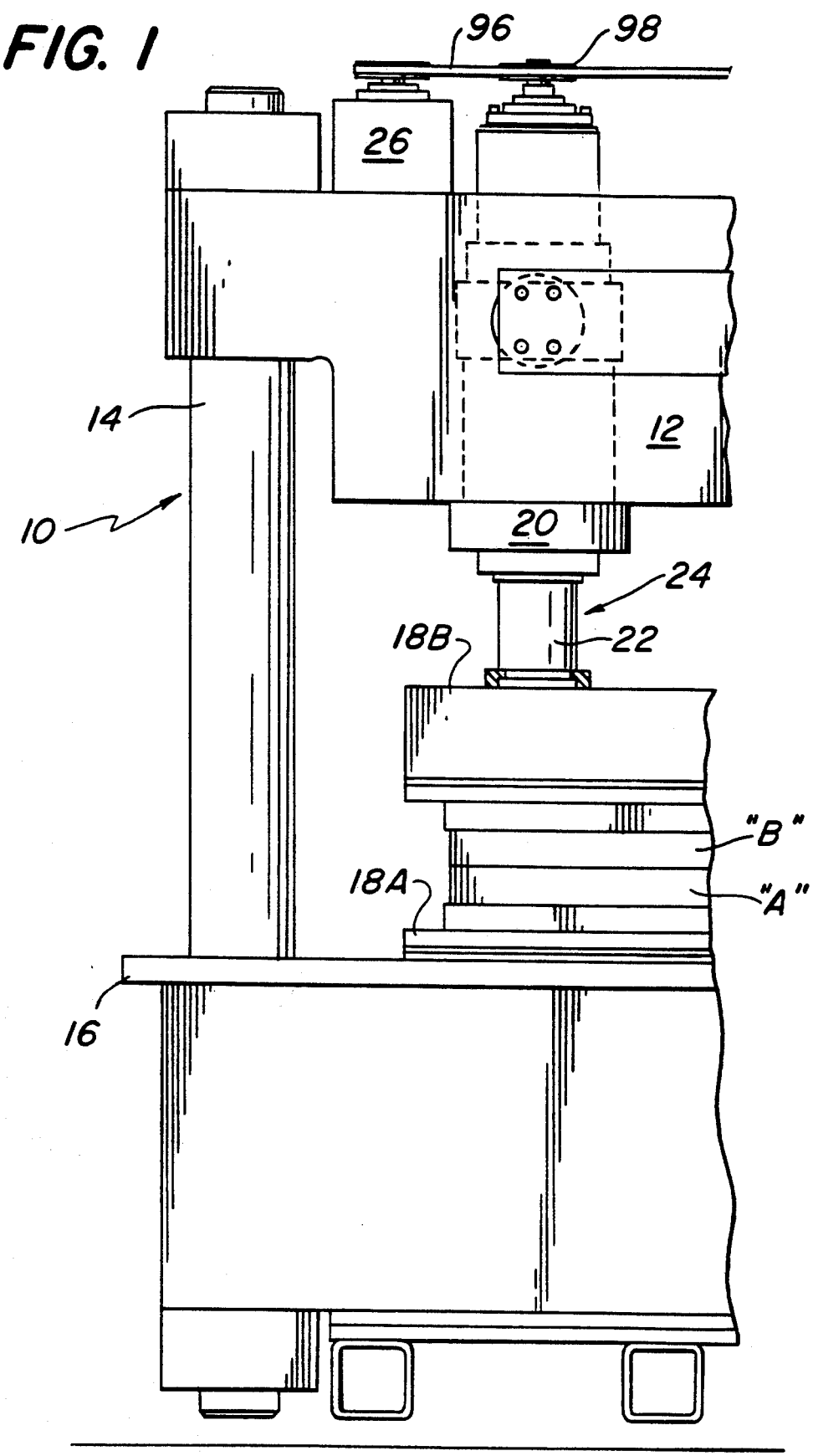
FIG. 1 is a front elevational view of a portion of a molding machine utilizing the closing and clamping system constructed in accordance with this invention.

Referring now in greater detail to the various figures of the drawings wherein like reference characters refer to like parts, there is shown in FIG. 1 a molding machine 10 utilizing a closing and clamping system 20 embodying the present invention.

Before discussing the details of the system 20 a brief description of the molding machine 10 is in order. The machine 10 includes an injection molding section and a blow molding section, although only a portion of one such section is shown in FIG. 1. Each section is constructed in a similar manner. Thus, each machine section basically comprises a crown 12 stationarily mounted on tie bars 14 (only one of which can be seen) projecting upward from a fixed bed 16. The mold closing and clamping system 20 is fixedly mounted on the crown 12 of the machine 10. In fact, each section of the machine includes a pair of mold closing and clamping systems 20 (although only one is illustrated).

As is conventional the machine's bed 16 is arranged to support thereon a fixed platen 18A on which the bottom or lower half of a pair of mold parts which make up the mold is located. The lower mold part is designated as "A" in FIG. 1, while the upper half of the pair of mold parts is designated as "B". The upper mold part B is mounted on a moveable platen 18B. That platen 18B is in turn mounted on downwardly extending piston rod 22 of a piston 24 (to be described in detail later) forming a portion of the mold closing and clamping system 20. In particular, since two systems 20 are mounted on the crown, the piston rod 22 of one system 20 serves to mount one side of the upper platen 18B, while the piston rod of the other system serves to mount the opposite side of that platen. This provides for a substantially uniform distribution of force over the entire extent of the upper platen 18B and teh mold part B carried thereby.

The pistons 24 of both systems employed to move a single mold section into engagement with an opposed mold section are arranged to move downwardly in unison under the control of a single electrical servomotor 26 (to be described later), or equivalent motor mounted on the crown 12. The servomotor 26 is controlled to operate at a first relatively high speed during a first predetermined number of rotations of the ball screws driven thereby, to bring the mold parts A and B close to each other. Thereafter the servomotor is slowed down to bring the mold parts into engagement with each other at a very low speed, to avoid damaging the mold parts. Rotation of the servomotor then is continued until a preset torque is developed by said servomotor. The preset torque is quite low, and is set to assure that the mold parts are in engagement with each other prior to imposing the high clamping force thereon. Even though the mold parts A and B are in engagement with each other prior to imposing the high clamping force on the mold parts, it is possible that the upper mold part B and the piston 24 may move downward slightly under the influence of the high clamping force. As will be explained in detail hereinafter, the electrically driven means is spring mounted to permit it to follow the downward movement of the piston 24, and thereby prevent the high clamping force from being imparted to, and possibly damaging the electrically driven members coupled to the piston. Suffice it to state at this point that the high clamping force is imposed upon the mold so that the molding operation (be it injection molding or blow molding) can be effected without undesired separation of the mold parts taking place.

Figure 2A:
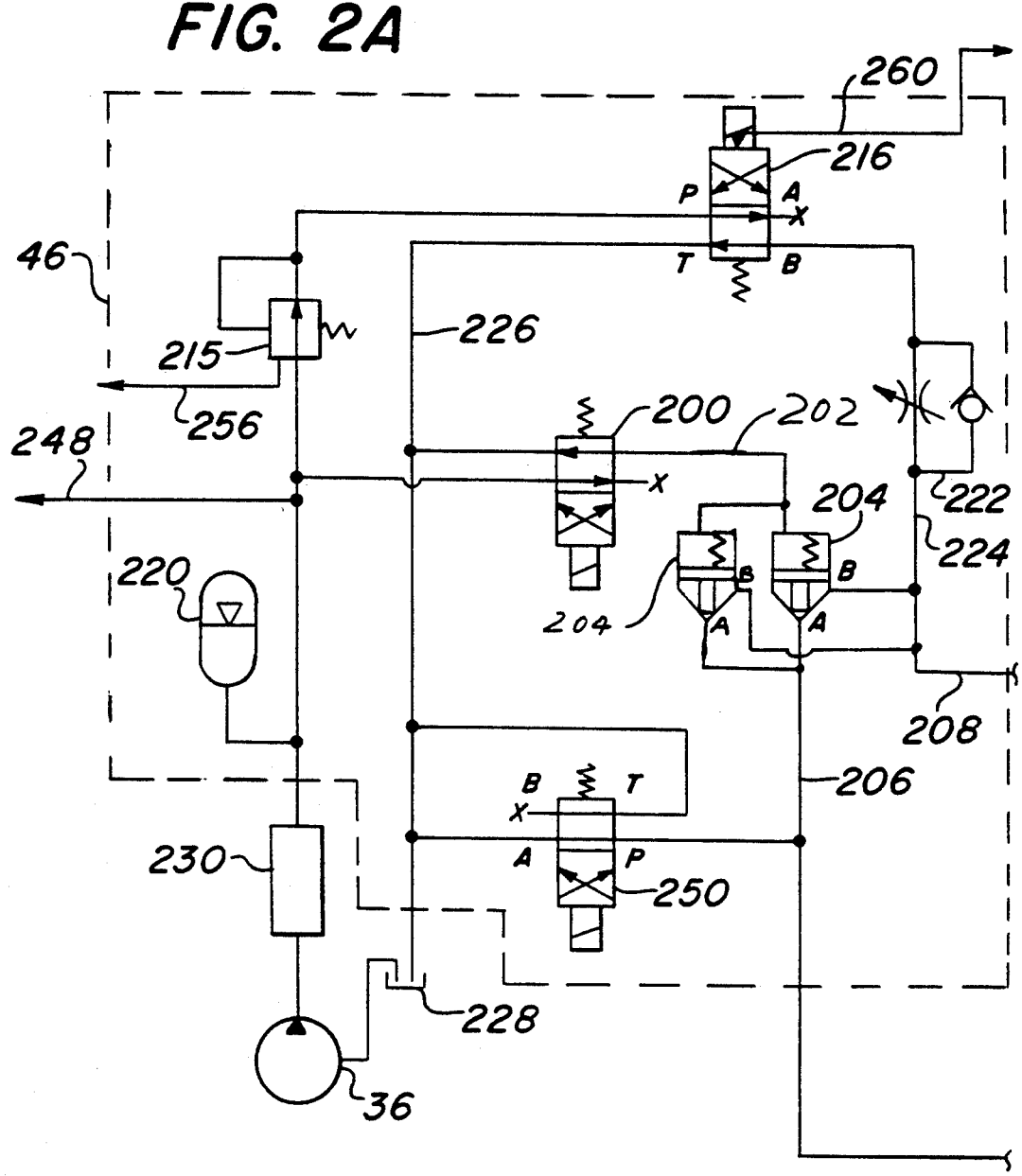
FIG. 2A is a schematic representation of the circuitry for the closing and clamping system.
Figure 2B:
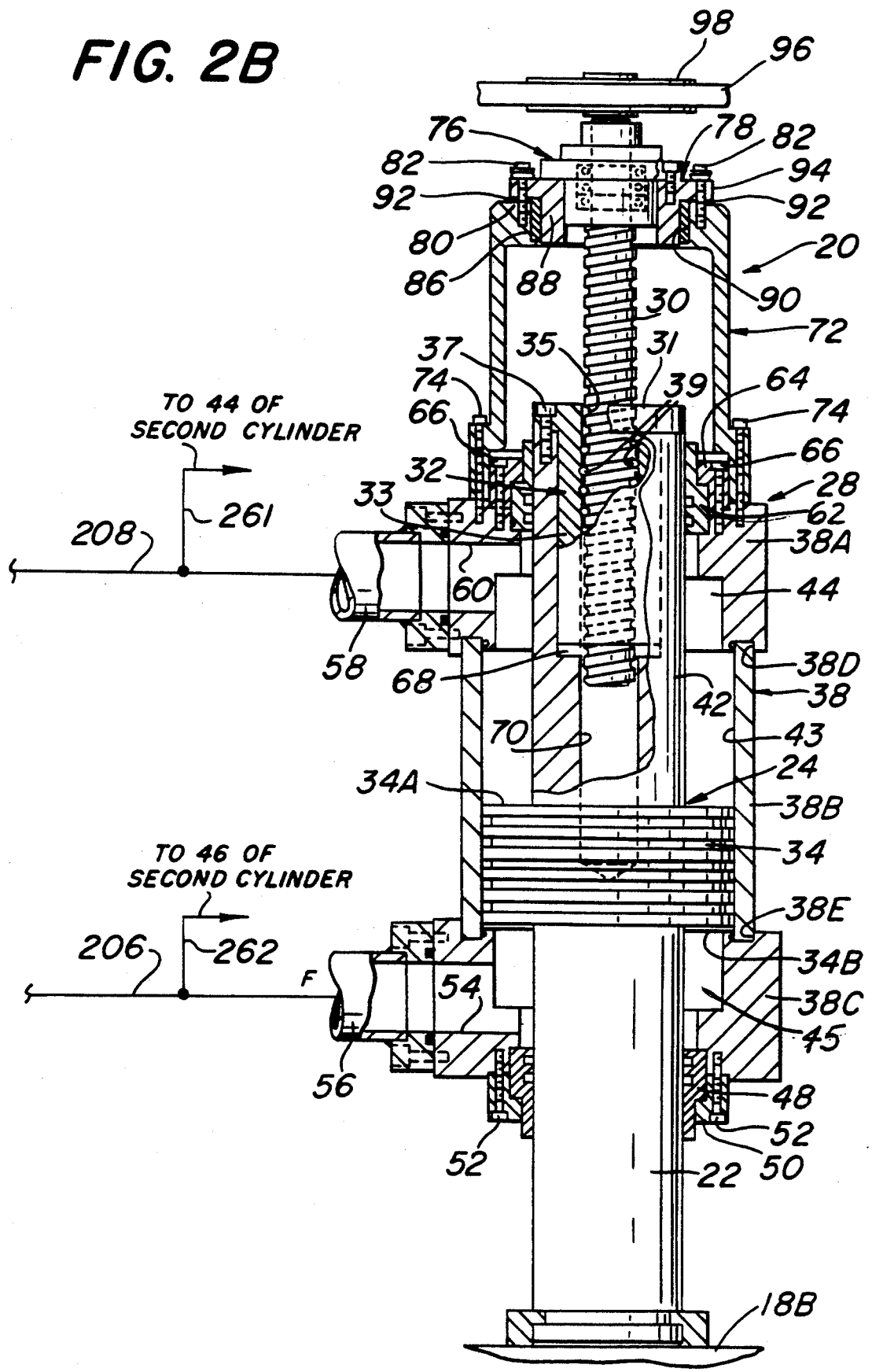
FIG. 2B is an enlarged sectional view of the closing and clamping system shown in FIG. 1.

The details of construction of mold closing and clamping systems 20 can best be appreciated by reference to Figs. 1 and 2B. As can be seen therein the system 20 generally comprises a hydraulic cylinder assembly 28 which includes the piston 24 that initially is operated or acted upon by the servomotor 26 through a ball screw 30 and associated ball nut 32 to close the mold parts A and B. Thereafter, a small additional volume of hydraulic oil is introduced into the hydraulic cylinder assembly 28 above piston head 34 of the piston 24 by a low horsepower, electrically operated hydraulic pump 36 (FIG. 2A), through associated hydraulic circuitry to be described in detail hereinafter, to impose a high clamping force on the mold parts A and B after the mold parts have been closed.

The cylinder assembly 28 comprises a housing 38 defining a hollow interior in which the piston 24 is located. The piston 24 includes, as a unitary construction, the central piston head 34, an upper piston rod 42, and the above-described lower piston rod 22.

The housing 38 includes a top cap member 38A, a tubular sidewall 38B, and a base member 38C. The piston head 34 includes sealing rings about its periphery for providing a fluid tight seal with inner surface 43 of the sidewall 38B. The top cap member 38A preferably has a square perimeter, and includes an annular groove 38D in a lower surface thereof, in which the top edge of the sidewall 38B is disposed. The base member 38C also preferably has a square perimeter, and also includes an annular groove 38E in which the bottom edge of the sidewall is disposed. Conventional tie rods (not shown) interconnect members 38A and 38C, to hold them together. In the preferred embodiment of the invention twelve (12) tie rods ar employed; three (3) adjacent each of the vertically aligned four corners of the top cap member 38A and base member 38C.

An annular recess is formed in the inner surface of the cap member to define a first chamber or space 44. That chamber is also made up of the portion of the interior of the cylinder housing 38 located immediately above top surface 34A of the piston head 34. A similar annular recess is formed in inner surface of the base member to define a second chamber or space 45. That chamber is also made up of the portion of the interior of the cylinder housing 38 located immediately below bottom surface 34B of the piston head 34.

The heretofore identified piston rod 22 extends downward through the second or lower chamber 45, from where it passes out of the housing 38 via a fluid-tight annular seal 48. The seal 48 is secured to the base member 38C via a retaining ring 50, through the use of plural threaded fasteners 52.

A port 54 is located in the base member 38C and communicates with the interior of the chamber 45. A conduit 56 communicates with the port 54. Thus, conduit 56 is connected to base member 38C through a conventional 4-bolt flange, to which the conduit is welded, and the conduit 56 communicates with the hydraulic circuitry to be described later herein. A second conduit 58 is secured to cap member 38A through the same type of flange connection utilized to connect the conduit 56 to the base member 38C. This conduit 58 communicates with a port 60 in the cap member 38A, and the port 60 in turn communicates with the interior of the upper chamber 44. The conduit 58 also communicates with the hydraulic circuitry to be described later herein. The top end of the cylinder housing 28 includes a fluid tight annular seal 62 which is secured to the cap member 38A via a retaining ring 64 and associated plural threaded fasteners 66.

The ball nut 32 is a unitary member including an annular head section 31 and a smaller diameter annular body section 33. An axial passage 35 extends through the head and body sections of the ball nut 32. The region of the passage 35 in the body section 33 has a smaller diameter than the region of the passage 35 in the head section, and is provided with grooves in which ball bearings 39 are rotatably retained for cooperating with the grooves provided by the helical threads of the ball screw 30. Unthreaded passages are spaced circumferentially about, and extend through the head section 31 of the ball nut 32, adjacent the periphery thereof, and threaded fasteners 37 (only one of which is shown) extend through these latter passages and are threadedly received in aligned threaded passages extending downwardly through the upper surface of the upper piston rod 42. As can be seen in FIG. 2B, the upper piston rod 42 also includes a centrally located bore 68 in which the body section 33 of the ball nut 32 is received.

The ball screw 30 is receivable within circular bore 70 as the piston 24 is moved upwardly by rotation of the ball screw 30 during the mold opening operation. The bore 70 is axially aligned with the central passage 35 in the ball nut 32, and extends downwardly through the upper piston rod 42 and into the piston head 34. The bore 70 also is axially aligned, and in communication with the bore 68 in which the body section 33 of the ball nut 32 is housed. The bore 70 is arranged to receive the ball screw 30, but without any driving connection with said ball screw. In other words, the ball screw 30 effects movement of the piston 24 solely through its ball bearing connection wit the ball nut 32.

A cup-shaped cover or mounting housing 72 is disposed over the top end of the cylinder assembly 28 and is secured to the top cap 38A via plural threaded fasteners 74. The housing 72 includes a central opening into which a bearing assembly 76 is mounted. The bearing assembly 76 has plural races of ball bearings therein (three such races being illustrated in bearing assembly 76) for journaling the upper end of the ball screw 30 therein to enable the ball screw to freely rotate about its longitudinal axis under power provided by the electrical motor 26 (FIG. 1), as will be described in detail later in this application.

A mounting member 78 for the bearing assembly 76 is spring mounted (in a manner to be described more fully hereinafter) to upper wall 80 of the housing 72 through the cooperation of threaded fasteners 82 and internal threade passages extending inwardly from the upper surface of said upper wall. A lubricated bearing 86 (e.g., a steel ring embedded with graphite) is provided between body section 8 of the mounting member 78 and an internal wall 90 providing a central bore extending through the upper wall 80 of the housing 72.

A desirable feature of the most preferred embodiment of this invention resides in the provision of spring mounting means for permitting, if and when necessary, slight axial movement of the ball screw 30 and the mounting thrust bearing assembly 76 when axial motion is imparted to the piston 2 during the imposition or release of a high clamping force on the piston via the introduction or removal of hydraulic oil into or from the upper chamber 44, respectively, of each of the assemblies 20. Preferably the spring mounting means are in the form of bellville washers 92, disposed around each of the threaded fasteners 82 between the upper wall 80 of the housing 72 and an upper annular flange section 94 of mounting member 78 for the bearing assembly 76. This resilient mounting for the mounting member 78 permits the mounting member, as well as the thrust bearing assembly 76 and the ball screw 30 rotatable within said bearing assembly to move slightly in an axial direction in the event the system is not "tuned" properly. In such a situation the high clamping force imposed on the piston head 34 may cause a slight downward movement of the mold part B (FIG. 1), and the piston 24 and ball nut 32 associated therewith. The spring means will be designed to flex under some predetermined maximum load, which is well below a force level which would damage the ball screw 30, the thrust bearing assembly 76 or the ball nut 32. However, it should be understood that when the apparatus is properly tuned or adjusted the predetermined maximum load at which the spring means is designed to flex should never be reached. In other words, the bellville washers 92 are provided as a safety feature in this invention.

Referring to FIGS. 1 and 2B, during the mold closing operation the servomotor 26 is operated to rotate the ball screw 30 in a mold closing direction, through the connection of timing belt 96 between the output of the servomotor 26 and a pulley 98 attached at the upper end to each ball screw 30 (only one ball screw being shown in the drawings). The servomotor 26 will be programmed to initially rotate at a relatively high speed for a predetermined number of revolutions, to bring the mold parts A and B close to, but not in engagement with each other. Thereafter, the speed of the servomotor will be gradually reduced so that contact between the mold parts A and B occurs at a very low velocity. Thereafter, the servomotor 26 will be programed to continue to rotate until a preset minimum torque is reached, to insure that the mold parts A and B are actually closed. However, it should be understood that there will be only a very low force imposed upon the ball screw 30 under this preset minimum torque condition.

Referring to FIGS. 2A and 2B, as the mold parts A and B are being closed, as described above, electric solenoid valve 200 is de-energized to release the pressure in line 202 and thereby permit a pair of identical poppet valves 204 to open (the poppet valves being shown in a closed condition in FIG. 2A). This, in turn, allows oil to flow from the lower chamber 45, below the piston head 34, through lines 206 and 208 into the upper chamber 44 above the piston head 34 in each of the clamping systems 20 connected to mold part B, as the piston head 34 is being moved downwardly. The pair of poppet valves 204 are provided in parallel to achieve the desired flow capacity in a system employing a 10 inch bore hydraulic cylinder. When a smaller hydraulic cylinder is used (e.g., one having a 7 inch bore) only a single poppet valve 204 may be employed to achieve the desired flow capacity.

When the mold halves are touching, but without any substantial pressure between them, the servomotor 26 (FIG. driving the ball screw stops turning (i.e., when a predetermined minimum torque value is achieved), and the electric solenoid valve 200 then is energized to maintain the poppet valves 204 closed. Electric solenoid valve 216 is then energized (it being shown deenergized in FIG. 2A) to allow oil from hydraulic pump 36 and from high pressure oil accumulator 220 to flow via pressure reducing valve 215 through the solenoid valve 216, through throttle/check valve 222 and through hydraulic lines 224 and 208 into the upper chambers 44 of the hydraulic cylinder assemblies 28, above the piston heads 34. It should be noted that only very small volumes of hydraulic fluid, e.g., on the order of one to three ounces, need to be transmitted into the upper chambers 44 by the pump 36, to establish the desired high clamping force on the mold parts A and B. This permits the use of a low horsepower hydraulic pump 36 to transfer hydraulic oil to the upper chambers 44.

Since the high force is imposed directly on the piston head 34 by the hydraulic oil, the ball screw 30, the ball nut 32 and the thrust bearing assembly 76 are not subjected to this high force. This is in distinction to the system disclosed in the Renfrew '973 patent discussed earlier in this application, wherein the high pressure clamping force on the mold parts is imparted directly onto the ball nut, and therefore onto the ball screw engaged by the nut. The arrangement in this invention clearly provides for a simpler, less costly construction than the Renfrew system. Moreover, the parts employed in this invention, and in particular the ball screw 30, the ball nut 32 and the thrust bearing assembly 76, are less likely to become prematurely worn or damaged than in a system in which a high clamping force is imparted to the mold parts directly through a ball screw/ball nut assembly. Furthermore, if the apparatus is not properly adjusted or tuned, and the imposition of the high clamping force to the piston head 34 causes a slight downward movement of the mold part B and/or piston 24, the provision of spring means 92 between the bearing mounting member 78 and the mounting housing 72 permits this same slight downward movement of the ball screw 30, ball nut 32 and bearing assembly 76, to thereby preclude exposing these latter members to the high clamping force, which very possibly would cause damage to or premature wear of these members.

In the preferred embodiment of the invention it is anticipated that the spring means will be bellville washers, as disclosed above, and that these washers normally will be preloaded in the assembled system. Thus, these washers only will compress to permit movement of the ball screw 30, the ball nut 32 and the bearing assembly 76 when the downward force imposed on these latter members exceeds the preloaded force. Of course the preloaded force will be sufficiently low to permit movement of the ball screw 30, the ball nut 32 and the thrust bearing assembly 76 before the downward force imposed on these latter members, by the downward movement of the piston 24 under the influence of the high clamping force, reaches a level which damages such members. However, as noted above, if the system is properly adjusted the preloaded force on the washers should not be reached during operation of the system.

When it is desired to open the mold parts A and B it is necessary to first release the high pressure clamping force. This is accomplished by de-energizing solenoid valve 216 to allow the high pressure oil within the upper chambers 44 of the hydraulic assemblies 28 to vent through the flow control valve 222 (which functions in this direction of flow to throttle the movement of oil therethrough), through solenoid valve 216, and then through hydraulic line 226 back to oil reservoir 228, in which oil is stored for supplying the hydraulic pump 36. In the event that a malfunction of the flow control valve 222 occurs, which causes the oil under pressure in upper chambers 44 of the assemblies 20 to escape from said chamber at an excessively fast rate, the bellville washers will assist in smoothing out the rapid decrease in pressure in the upper chamber to thereby prevent an abrupt and rapid upward movement of the piston 24, which could damage the ball screw 30, the ball nut 32 and/or the thrust bearing assembly 76.

The oil reservoir 228 can be of any conventional construction. In accordance with a preferred design the reservoir holds on the order of twenty gallons of oil, to provide a source of oil for use with the low horsepower hydraulic pump 36.

As indicated earlier, the small volume of pressurizing oil introduced into the upper chambers 44 of the assemblies 28 is directed into the upper chambers by the low horsepower hydraulic pump 36 (i.e., 7.5 horsepower) and from the high pressure accumulator 220. The use of a high pressure accumulator eliminates the need for using a higher horsepower pump.

Referring to FIG. 2A, the hydraulic accumulator 220 is filled with oil under pressure from the pump 36. The oil is directed from the pump 36 through a series of valves, in a conventional manner, such valves being collectively and schematically illustrated at 230. One of the valves is of a conventional design for preventing the overcharging of the accumulator 220. A second valve is a conventional solenoid valve which is provided to vent both the hydraulic pump 36 and the accumulator 220 when it is deenergized (e.g., by a power failure or manual action). It should be noted that during normal operation of the device this latter solenoid valve is maintained in an energized state, so that neither the hydraulic pump 36 nor the accumulator 220 will be vented.

A third valve schematically illustrated at 230 is a conventional adjustable safety relief valve to vent hydraulic fluid in the line in the event that an excessively high pressure level is reached, as determined by the setting of the safety release valve. In accordance with a preferred mode of operation the safety release valve is set at a pressure level which is higher than the clamping pressure which is to be imparted to the mold parts, but not so high as to result in damage to the system. For example, when a clamping pressure of approximately 3,300 psi is to be established, the safety relief valve may be set at approximately 3,900 psi.

Periodically it is necessary and/or desirable to change the oil employed in the system. To permit such a change the circuitry is provided with a control valve 250. This control valve is manually opened (which is the condition illustrated in FIG. 2A), when it is desired to drain the oil, to thereby establish a connection between the lower chamber 46 of each of the assemblies 28 and the reservoir 228. The assemblies 28 are then operated to move the mold parts from their completely open position to their closed position, to thereby force the oil from the lower chambers 46 of the assemblies 28, through the control valve 250, to the drainage reservoir 228. During normal operation of the system the control valve 250 is energized, to establish a connection between P - B of that valve.

In a preferred embodiment of this invention, the hydraulic circuit illustrated in FIG. 2A is employed in connection with two hydraulic cylinder assemblies 28 associated with the injection molding side of an injection blow molding machine. This is illustrated schematically by lines 261 and 262 in FIG. 2B.

Moreover, in order to utilize the hydraulic pump 36 and accumulator 220 in conjunction with a similar hydraulic circuit associated with the blow molding side of the machine, a suitable hydraulic transfer line 248 communicates with said pump and accumulator through a port (not shown) in the housing or manifold schematically illustrated at 46. The hydraulic transfer line 248 transmits hydraulic fluid from the pump 36 and accumulator 220 to an arrangement of valves identical to those included in the manifold 46, as is shown in FIG. 2A, for controlling the operation of two hydraulic cylinder assemblies (not shown), identical to hydraulic cylinder assembly 28, to control the closing and opening of mold halves associated with the blow molding side of the injection blow molding machine.

The housing or manifold 46 for the control circuitry also includes a plurality of gauge ports (not shown) which are conventional in valve systems, and are employed to permit the attachment of pressure gauges and other devices employed to troubleshoot the system.

The control system also includes a line 256 which connects an operator station with the pressure reducing valve 215 to permit the remote setting of the pressure at which the pressure-reducing valve operates, to thereby control the pressure imposed upon the mold halves, by operation of the hydraulic pump 36 and accumulator 220.

The system also has a conventional connection via line 260 to valve 216, for preventing that valve from becoming energized if a safety gate or guard is opened and/or removed to provide access to the mold. In this manner high pressure oil is precluded from being transmitted from either the hydraulic pump 36 or the accumulator 220 to the upstream side of the piston heads 34, thereby precluding possible injury to an operator by the application of a high closing pressure to the mold part B.

In a preferred embodiment of the invention the pressurizing oil is introduced to provide a pressure of approximately 3,300 psi in each of the assemblies 28, and the surface are of each piston head 34, on which the oil directly acts, is approximately 55 sq. in. Thus, when two assemblies 28 are used to close and clamp the mold parts A and B, approximately 360,000 pounds (i.e., approximately 180 tons) of clamping force is imposed on the mold parts.

It should be understood that the size, rating, and/or capacity of the various components utilized in this invention depend upon a number of factors, including the clamping force to be applied between the mold sections, the speed of movement to be imparted to the mold sections during the closing operation, the size of the hydraulic cylinders utilized in the system, etc. It also should be understood that the selection of the proper components is within the purview of a person skilled in the art, and does not constitute a limitation on the present invention.

In an exemplary embodiment of this invention the pump/motor 36, as well as the various valves are obtained from the Rexroth Corporation of Bethlehem, Pennsylvania, and are designated as follows:

Valves 200 and 250 - 4WE10D3X/CW110N9Z45V
Valve 204 - L C63A00E6X
Valve 215 - DR20-2-3X/315YM/12
Valve 216 - H4W-EH22D7X/6AW120-60TZ45/D1
Valves 230:
 (a) DA6VP2-2X/315-17M
 (b) 4WE6D5X/AW120-60NZ45/B10V
 (c) DBDS6K1X/315
 (d) ZDR6DP2-4X/150YM/12
 (e) 4WE6E5X/AW120-60NZ45V
 (f) Z2FS6-2-4X/2Q
Motor/pump 36 - 7.5 HP, @ 1750RpM, 230/460 VAC 3 PHASE, 60 HZ, and 1PF1R4-1X/6.3-500RA12MO1 RADIAL PISTON PUMP While the principles of the invention have been described with regard to the particular embodiment, it is to be understood that the description is made by way of example only and not as a limitation on the scope of the invention which is set forth in the appended claims.

What is claimed is:

1. A system to move a pair of members into engagement and to apply a high clamping force to said engaging members, said system comprising pump means and housing means, said housing means comprising first and second chambers having an actuating fluid therein, piston means located within said housing means and coupled to one of said pair of members and electrically driven means located within said housing means and being coupled to said piston means, said electrically driven means being arranged to move said piston means in a first direction to move said one of said pair of members into engagement with the other of said pair of members, said movement of said piston means in said first direction causing actuating fluid from said second chamber to flow into said first chamber, said pump means being arranged to provide additional actuating fluid to said first chamber after the pair of members are in engagement with each other for applying a clamping force directly to said piston means coupled to said one of said pair of members, and not to said electrically driven means.

2. The system of claim 1 wherein the pair of members are two mold sections of a molding machine and wherein the actuating fluid is hydraulic fluid.

3. The system of claim 2 additionally comprising valve means coupled between said first and second chambers.

4. The system of claim 3 additionally comprising a first electrical motor, and wherein said electrically driven means comprises a ball screw coupled to said first motor and a ball nut mounted on said ball screw and coupled to said piston means.

5. The system of claim 4 wherein said first electrical motor comprises a servomotor.

6. The system of claim 5 wherein said pump means comprises a second electrical motor.

7. The system of claim 6 additionally comprising a reservoir for said additional hydraulic fluid.

8. The system of claim 2 wherein said valve means is controllable to enable said hydraulic fluid to flow from said second chamber to said first chamber when said piston means is moved in said first direction, and to preclude said hydraulic fluid from said second chamber from flowing into said first chamber when said additional hydraulic fluid is provided by said pump means into said first chamber.

9. The system of claim 2 wherein said pump means comprises an electrical motor.

10. The system of claim 9 additionally comprising a reservoir for said additional hydraulic fluid, said reservoir being coupled to said pump means.

11. The system of claim 2 additionally comprising a reservoir for said additional hydraulic fluid.

12. The system of claim 2 additionally comprising a first electrical motor, and wherein said electrically driven means comprises a ball screw coupled to said first motor and a ball nut mounted on said ball screw and coupled to said piston means.

13. The system of claim 12 wherein said ball nut is fixedly secured against movement relative to said piston means.

14. The system of claim 12 wherein said first electrical motor comprises a servomotor.

15. The system of claim 14 wherein said pump means comprises a second electrical motor.

16. The system of claim 15 additionally comprising a reservoir for said additional hydraulic fluid.

17. The system of claim 2 wherein said electrically driven means is also arranged to move said piston means in a second direction, opposite to said first direction, whereupon the movement of said piston in said second direction causes hydraulic fluid from said first chamber to flow into said second chamber.

18. The system of claim 17 additionally comprising a reservoir for said additional hydraulic fluid.

19. The system of claim 17 additionally comprising valve means coupled between said first and second chambers.

20. The system of claim 18 wherein said valve means is controllable to enable said hydraulic fluid to flow from said second chamber to said first chamber when said piston means is moved in said first direction, to preclude said hydraulic fluid from said second chamber from flowing into said first chamber when said additional hydraulic fluid is provided by said pump means into said first chamber, and to enable said hydraulic fluid to flow from said first chamber to said second chamber when said piston means is moved in said second direction.

21. The system of claim 2, including spring means for mounting said electrically driven means for axial movement.

22. The system of claim 2 additionally comprising a first electrical motor, and wherein said electrically driven means comprises a ball screw coupled to said first motor and a ball nut mounted on said ball screw and coupled to said piston means, and spring means for mounting said electrically driven means for limited axial movement.

23. The system of claim 22, additionally including bearing means rotatably mounting said ball screw, said spring means for mounting said electrically driven means for limited axial movement providing for said limited axial movement of said bearing means, said ball screw and said ball nut.

* * * * *